Dec. 4, 1928.
T. MIDGLEY
1,694,227
SPLICE HOLDING DEVICE FOR TIRE EXPANDERS
Filed Aug. 6, 1926
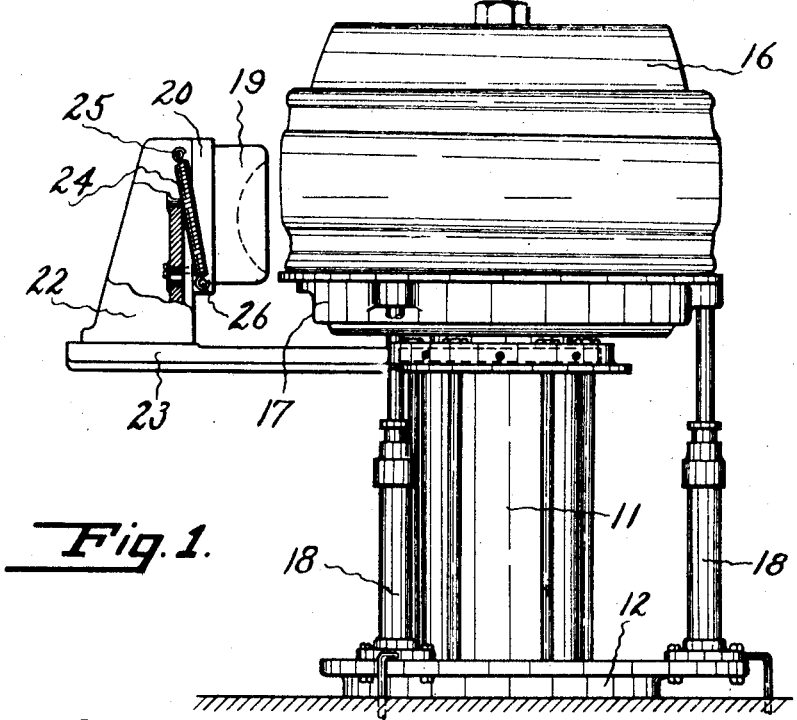
Fig. 1.
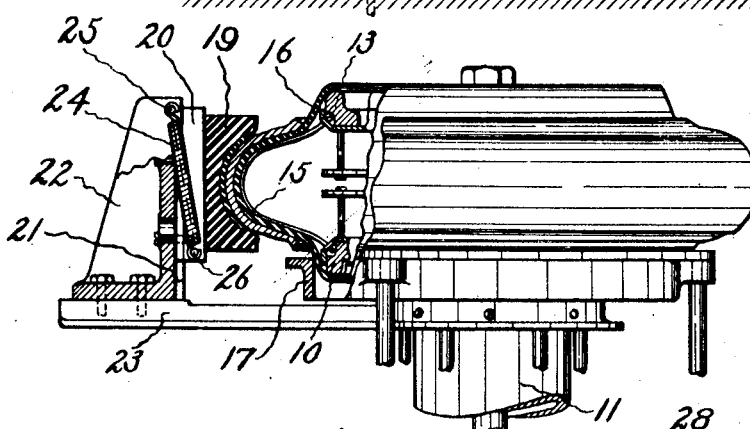
Fig. 2.
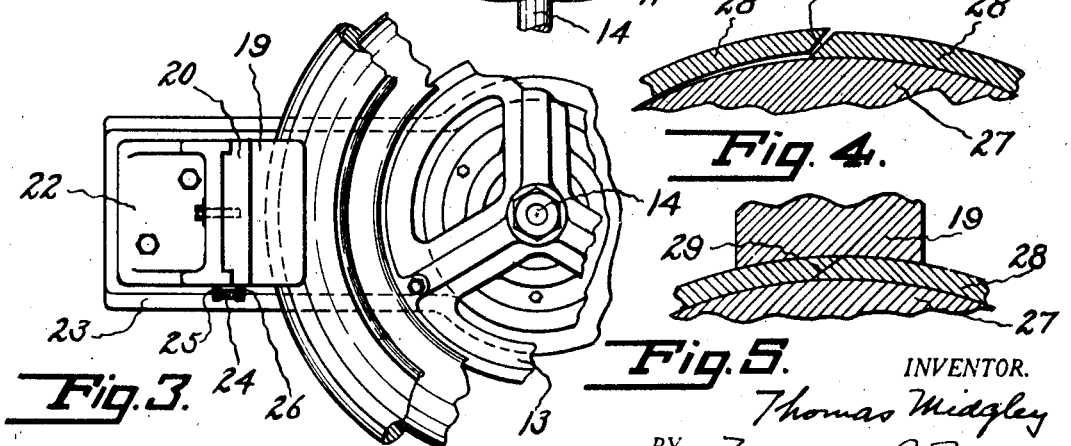
Fig. 3.
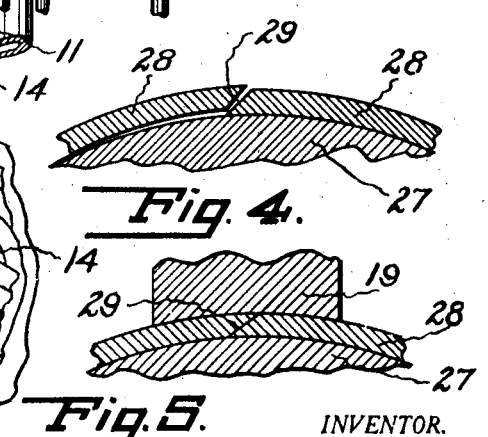
Fig. 4.
Fig. 5.
INVENTOR.
Thomas Midgley
BY Franklin G. Neal
ATTORNEY.

Patented Dec. 4, 1928.

1,694,227

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

SPLICE-HOLDING DEVICE FOR TIRE EXPANDERS.

Application filed August 6, 1926. Serial No. 127,496.

My invention relates to the expansion of pneumatic tire casings from flat form to the usual horse-shoe cross-section. In the operation of prior devices for accomplishing this purpose, difficulty has been experienced on account of the splice of the tread rubber coming loose. As a consequence of this the treads would partially separate from the underlying carcass and would need to be repaired after they have been expanded. By the use of my invention this difficulty is removed.

Referring to the drawings:

Fig. 1 is a side elevation of a machine embodying my invention;

Fig. 2 is a similar view in a different operative position, showing certain parts of the machine broken away;

Fig. 3 is a partial top plan view of the machine;

Fig. 4 is a diagrammatic detail section showing the difficulty experienced in the use of prior devices; and Fig. 5 is a similar view showing the operation of my improved device.

The improved device will be described in connection with an expander which I have previously developed for this use, and which is described in my prior application, Serial No. 88,194, filed February 15, 1926. This prior device will not be described in detail, but certain of the parts will be discussed briefly, in order that a better understanding of the operation of my present invention may be had. The expander shown in my prior application comprises a fixed head 10 which is connected to a pneumatic cylinder 11 fastened upon the machine base 12. The machine also has a movable head 13 secured to the upper end of a piston rod 14 having a piston, not shown in the present case, running in the pneumatic cylinder 11. Joining the fixed and the movable heads are springs 15 extending between them in a plurality of superposed layers. As the heads are caused to approach each other, due to the action of the pneumatic cylinder and piston, the springs are caused to bow outwardly as shown in Fig. 2, and as is more fully described in my prior application above referred to. Surrounding these springs is preferably an elastic sheath 16 of vulcanized rubber. In order to strip the expanded tire from the machine, a stripping ring or ledge 17 is provided, this being operated by pneumatic cylinders 18 in a manner fully described in my prior case.

To a machine, such as is described above, and which is disclosed with much more detail in my prior application, my invention may be applied as follows: A rubber block 19, preferably made of a yielding and flexible composition, is secured upon a support 20 running in ways 21 upon a bracket 22. This bracket is supported upon a shelf 23 at one side of the expander so that the block 19 is in position to be engaged by the tire when the latter is expanded. As the tire is expanded from the position of Fig. 1 to that of Fig. 2 its center is lowered on account of the fact that head 10 remains fixed while head 13 descends. The center of the tire will thus be lowered a distance approximately half the motion of head 13. For this reason the block 19 is made movable so that at the time the tire engages with it, which is preferably slightly before the maximum expansion has taken place, the tire and the block may have a slight downward movement together. To this end the slide 20 upon which the rubber block is mounted is held at its uppermost position on ways 21 by a spring 24, held at its upper end by a pin 25 on the bracket 22, and at its lower end by a pin 26 on the support 20. As the tire contacts with the block 19, as shown in Fig. 2, the block can yield slightly downwardly due to the action of the spring 24; a slight outward yielding of the block is made possible by the elastic nature of this material.

In operation, the flat band tire having a tread 28 applied thereto is placed upon the shelf 17 as shown in Fig. 1. Air is admitted to the pneumatic cylinder 11 in order to cause the heads 13 and 10 to approach each other and by their approach to cause the springs 15 to be bowed outwardly. This forces the tire into the tire form shown in Fig. 2. The tire is positioned initially so that its splice 29 comes at the point where it will contact with the rubber block 19. In Fig. 5 the end of this block is clearly shown in which it appears that the splice 29 is pinched between block 19 and the body of the tire 27. By this means the tight adhesion of the surfaces forming the splice is assured.

Having thus described my invention, I claim:

1. An apparatus for expanding a tire from the flat into tire form comprising means for applying a shaping force to a tire, and means for resisting the shaping force at the outer circumference of the tire to exert a holding pressure upon the splice of the tire tread while leaving the sidewalls of the tire unconfined for readjustment to shaped condition.

2. An apparatus for expanding a tire from the flat into tire form comprising means for applying a shaping force to a tire, and a member yieldable both radially and laterally of the tire against which the tire is pressed by the shaping means to hold the splice of the tire tread in position.

THOMAS MIDGLEY.